United States Patent
Liu (10) Patent No.: US 12,255,994 B2
(45) Date of Patent: Mar. 18, 2025

(54) SECURE DATA STORAGE WITH A DYNAMICALLY GENERATED KEY

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 40 days.

(21) Appl. No.: 17/340,683

(22) Filed: Jun. 7, 2021

(65) Prior Publication Data

US 2022/0393859 A1 Dec. 8, 2022

(51) Int. Cl.
*H04L 9/08* (2006.01)
*H04L 9/32* (2006.01)

(52) U.S. Cl.
CPC ............ *H04L 9/088* (2013.01); *H04L 9/0861* (2013.01); *H04L 9/3278* (2013.01)

(58) Field of Classification Search
CPC ...... H04L 9/088; H04L 9/0861; H04L 9/3278
USPC .......................................................... 713/171
See application file for complete search history.

(56) References Cited

U.S. PATENT DOCUMENTS

| | | | | |
|---|---|---|---|---|
| 8,868,923 B1* | 10/2014 | Hamlet | .................... | G06F 21/00 326/8 |
| 11,042,489 B2* | 6/2021 | Kang | .................. | G06F 12/1408 |
| 11,044,108 B1* | 6/2021 | Aronson | ............... | H04L 9/0866 |
| 11,049,565 B2* | 6/2021 | Cowles | ................. | G11C 11/225 |
| 11,698,973 B2* | 7/2023 | Patel | ..................... | H04L 9/0866 713/193 |
| 2012/0278579 A1* | 11/2012 | Goss | ................... | G06F 12/0246 711/E12.002 |
| 2013/0051552 A1* | 2/2013 | Handschuh | ........... | H04L 9/0897 380/44 |
| 2015/0234751 A1* | 8/2015 | Van Der Sluis | ..... | G06F 12/1408 713/193 |
| 2016/0078252 A1* | 3/2016 | Chandra | ................. | G06F 21/72 713/190 |
| 2016/0283937 A1* | 9/2016 | Reese | ................ | G06Q 20/4012 |
| 2016/0364583 A1* | 12/2016 | Benoit | .................. | H04L 9/3278 |
| 2017/0046281 A1* | 2/2017 | Chandra | ............... | H04L 9/0866 |
| 2018/0018673 A1* | 1/2018 | Muchsel | ............ | G06Q 20/4016 |
| 2019/0028283 A1* | 1/2019 | Sharifi | ..................... | G06F 21/86 |
| 2019/0044715 A1* | 2/2019 | Hunacek | ............... | H04L 9/0866 |
| 2019/0121749 A1* | 4/2019 | Kang | .................. | G06F 12/0246 |
| 2019/0140851 A1* | 5/2019 | Ma | ........................ | H04L 9/3278 |
| 2019/0207774 A1* | 7/2019 | Anzai | ....................... | H04L 9/50 |
| 2019/0384938 A1* | 12/2019 | Gu | ....................... | G06F 12/1408 |
| 2020/0089921 A1* | 3/2020 | Karakoyunlu | ........ | H04L 9/0866 |
| 2020/0219085 A1* | 7/2020 | Sharifi | ............... | G06Q 20/3226 |
| 2021/0312057 A1* | 10/2021 | Kloth | ....................... | H04L 9/088 |
| 2021/0385072 A1* | 12/2021 | Wu | ........................ | H04L 9/0631 |
| 2022/0391517 A1* | 12/2022 | Benson | .................. | G06F 21/575 |

* cited by examiner

*Primary Examiner* — Dereena T Cattungal
(74) *Attorney, Agent, or Firm* — Greenberg Traurig (57) ABSTRACT

The disclosed embodiments relate to securing operations accessing a non-volatile storage area of a memory device. In one embodiment, a method is disclosed comprising generating, by firmware of a memory device, a cryptographic key using a value of a physically unclonable function (PUF); writing, by the firmware, the cryptographic key to a volatile storage area; receiving, by the firmware, a command accessing a non-volatile storage area from a host processor; and processing, by the firmware, the command using the cryptographic key.

20 Claims, 6 Drawing Sheets

SECURE DATA STORAGE WITH A DYNAMICALLY GENERATED KEY

TECHNICAL FIELD

At least some embodiments disclosed herein relate to memory devices in general, and more particularly, but not limited to authenticating to securing input/output (I/O) operations in a memory device.

BACKGROUND

A memory subsystem can include one or more memory devices that store data. The memory devices can be, for example, non-volatile memory devices and volatile memory devices. A host system can utilize a memory subsystem to store data at the memory devices and retrieve data from the memory devices.

BRIEF DESCRIPTION OF THE DRAWINGS

The embodiments are illustrated by way of example and not limitation in the figures of the accompanying drawings in which identical references indicate similar elements.

DETAILED DESCRIPTION

In the disclosure, a memory device can include a physically unclonable function (PUF) that generates a unique value. A key generator, such as a symmetric key generator, uses the unique value generated by the PUF to generate a key. Since the PUF can repeatedly generate the same unique value, and the key algorithm can be deterministic, the memory device does not need to store the key in non-volatile memory, preventing leakage of the key. The key may be stored in volatile memory while the memory device is powered on. Thus, in response to a power-off (or power interruption), the key is erased from volatile memory. Therefore, even if an attacker physically has the memory device, they cannot launch a lab access (or similar) attack by physically dismounting the memory device to retrieve the key from the device since the key will only exist when the device is powered on.

In one embodiment, the PUF is in the firmware of the memory device. In such an embodiment, the key is protected from probing internal volatile memory since it doesn't use the internal volatile memory. In some embodiments, an application-specific integrated circuit (ASIC), field-programmable gate array (FPGA), or dedicated cryptoprocessor can be used to increase the speed of encryption. In these embodiments, data is protected when the memory device is powered off since the key cannot be retrieved by physically dismounting the memory device. Thus, in some embodiments, the encryption is not done by the host computer but by the memory device itself. In some embodiments, this memory device can comprise an embedded multimedia card (eMMC), solid-state device (SSD), or similar device.

During operation, after the memory device powers on, the firmware in the memory device can generate a unique value using a PUF. Next, the firmware can generate a key from the unique value. The firmware then can write the key to volatile storage such as dynamic random-access memory (DRAM), static random-access memory (SRAM), register file, etc. The firmware then proceeds to securely process commands accessing a storage medium (e.g., a NAND Flash array) using the key. In some embodiments, the entire process can be interrupted by a power-off condition. In response to such a condition, the key is implicitly or explicitly erased from volatile storage. Data in the non-volatile storage area can thus be persistently saved in an encrypted state without corresponding storage of the decryption key.

In one embodiment, the memory device (i.e., firmware or controller) receives a write command. The memory device can read a key from volatile storage. The memory device can encrypt the data in the write command using a key algorithm and the key. The memory device can write the encrypted payload to a non-volatile storage area. In another embodiment, the memory device (i.e., firmware or controller) receives a read command. The memory device can read encrypted data from an address in the read command. The memory device can read a key from volatile storage. The memory device can decrypt the data using a key algorithm and the key. The memory device can then return the decrypted data.

Figure 1:
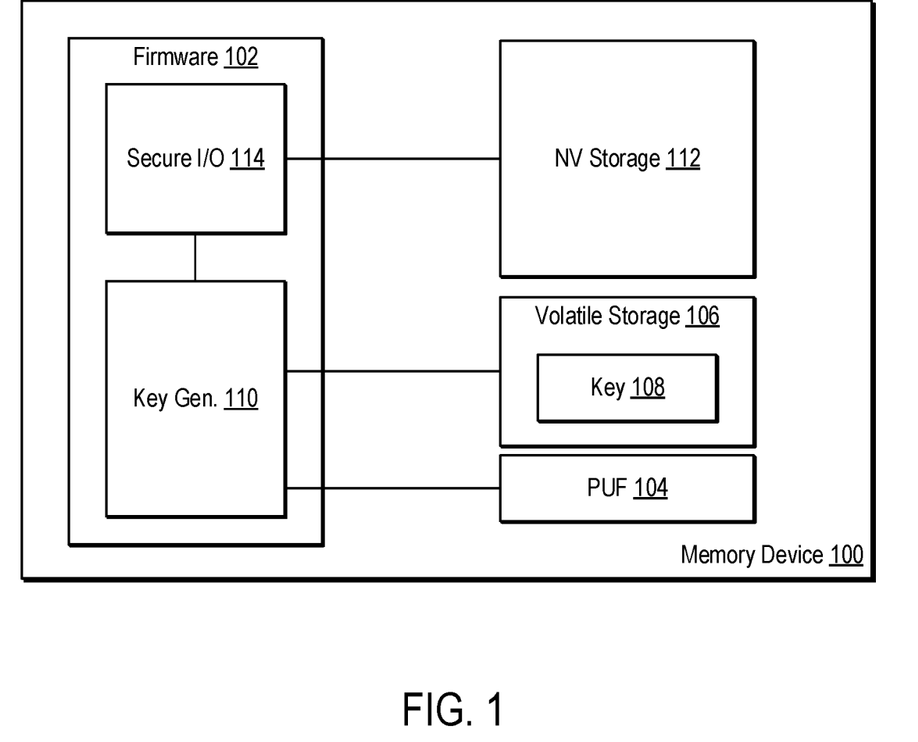
FIG. 1 is a block diagram of a memory device according to some embodiments.

FIG. 1 is a block diagram of a memory device according to some embodiments.

In one embodiment, a memory device 100 includes firmware 102, non-volatile storage area 112, volatile storage area 106 (storing a key storage area 108), and a physically unclonable function 104. In one embodiment, firmware 102 includes key generation logic 110 and secure input/output logic 114.

In an embodiment, a memory device 100 can comprise a non-volatile memory device such as an SSD, a flash drive, a universal serial bus (USB) flash drive, an eMMC drive, a Universal Flash Storage (UFS) drive, a secure digital (SD) card, or a hard disk drive (HDD).

In an embodiment, the memory device 100 includes a non-volatile storage area 112. In an embodiment, a non-volatile storage area 112 can comprise an array of memory cells. In one embodiment, a non-volatile storage area 112 can comprise an array of NAND Flash cells. One type of memory cell, for example, single-level cells (SLC), can store one bit per cell. Other types of memory cells, such as multi-level cells (MLCs), triple-level cells (TLCs), quad-level cells (QLCs), and penta-level cells (PLCs), can store multiple bits per cell. In some embodiments, the non-volatile storage area 112 can include one or more arrays of memory cells such as SLCs, MLCs, TLCs, QLCs, PLCs, or any combination of such. In some embodiments, the non-volatile storage area 112 can include an SLC portion, an MLC portion, a TLC portion, a QLC portion, and/or a PLC portion of memory cells. The memory cells of the non-volatile storage area 112 can be grouped as pages that can refer to a logical unit of the memory device used to store data. With some types of memory (e.g., NAND), pages can be grouped to form blocks.

Although non-volatile memory devices such as 3D crosspoint type and NAND type memory (e.g., 2D NAND, 3D NAND) are described, the memory device 100 can be based on any other type of non-volatile memory, such as read-only memory (ROM), phase-change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, electrically erasable programmable read-only memory (EEPROM), etc.

In alternative embodiments, the memory device 100 can include volatile storage area 106. In alternative embodiments, volatile storage area 106 can include a DRAM, SRAM, register file, or another similar type of storage area or device that loses the data stored thereon when not powered by an external power source. As illustrated, when powered, volatile storage area 106 can include a key storage area 108. In one embodiment, the key storage area 108 can be generated by firmware 102. Specifically, in one embodiment, the key storage area 108 can be generated by key generation logic 110. In one embodiment, key storage area 108 can comprise a symmetric key. In other embodiments, key storage area 108 can comprise an asymmetric key or key pair. In one embodiment, key storage area 108 can comprise the private key portion of an asymmetric public-private key pair.

In one embodiment, the memory device 100 can include a PUF 104. In the illustrated embodiment, the PUF 104 may comprise a physical hardware circuit that exploits inherent randomness introduced during manufacturing to give a physical entity a unique 'fingerprint' or trust anchor. In the illustrated embodiment, the PUF 104 produces a consistent and repeatable value. In some embodiments, the PUF 104 may comprise an SRAM PUF, Delay PUF, or any other PUF technology implemented on the memory device 100.

In the illustrated embodiment, memory device 100 includes firmware 102. In one embodiment, firmware 102 comprises a non-transitory computer-readable storage medium for tangibly storing computer program instructions capable of being executed by a computer processor, the computer program instructions defining various steps described herein. In the illustrated embodiment, firmware 102 can be stored in a dedicated storage device such as read-only memory (ROM), erasable programmable ROM (EPROM), electrically erasable programmable ROM (EEPROM), or Flash (NAND or NOR) memory. In the illustrated embodiment, firmware 102 implements various functions, including, but not limited to, key generation logic 110 and secure input/output logic 114. Certainly, firmware 102 can implement additional functions such as lower-level hardware control functions. These additional functions are not described in detail for the sake of clarity. Firmware 102 can be configured to execute the functionality described in FIGS. 2 through 4.

In the illustrated embodiment, key generation logic 110 comprises executable code and/or dedicated hardware circuitry to generate an encryption (and decryption) key and store the key in key storage area 108. In one embodiment, key generation logic 110 can implement any symmetric or asymmetric algorithm. Examples of symmetric algorithms include, but are not limited to, Advanced Encryption Standard (AES), Salsa20/ChaCha20, CAST, Twofish, IDEA, Serpent, RC5, RC6, Camellia, and ARIA algorithms. Examples of asymmetric algorithms include, but are not limited to, RSA, ECC, ElGamal, DHKE, ECDH, DSA, ECDSA, EdDSA algorithms. In some embodiments, key generation logic 110 is configured to execute the methods discussed in FIG. 2, the disclosure of which is not repeated herein.

In the illustrated embodiment, secure input/output logic 114 comprises executable code and/or dedicated hardware circuitry to intercept insecure I/O commands and convert these commands to secure I/O commands. As used herein, an insecure I/O command can comprise any command issuable to the memory device 100. For example, read and write commands accessing non-volatile storage area 112 can comprise insecure I/O commands. By contrast, a secure I/O command can comprise a command that reads, writes, or otherwise accesses encrypted data stored in non-volatile storage area 112. In brief, secure input/output logic 114 receives an insecure I/O command, loads a key (either from key storage area 108 or by causing the key generation logic 110 to regenerate the key), and then converts the insecure I/O command to a secure I/O command using the key. If the insecure I/O command is a read command, secure input/output logic 114 reads the encrypted data from non-volatile storage area 112 and can decrypt the encrypted data with the key prior to returning the decrypted data to the calling device. If the insecure I/O command is a write command, secure input/output logic 114 can encrypt the data to write using the key and then persist the data to non-volatile storage area 112, returning a success or error code as appropriate. In some embodiments, secure input/output logic 114 is configured to execute the methods discussed in FIGS. 3 and 4, the disclosure of which is not repeated herein.

Figure 2:
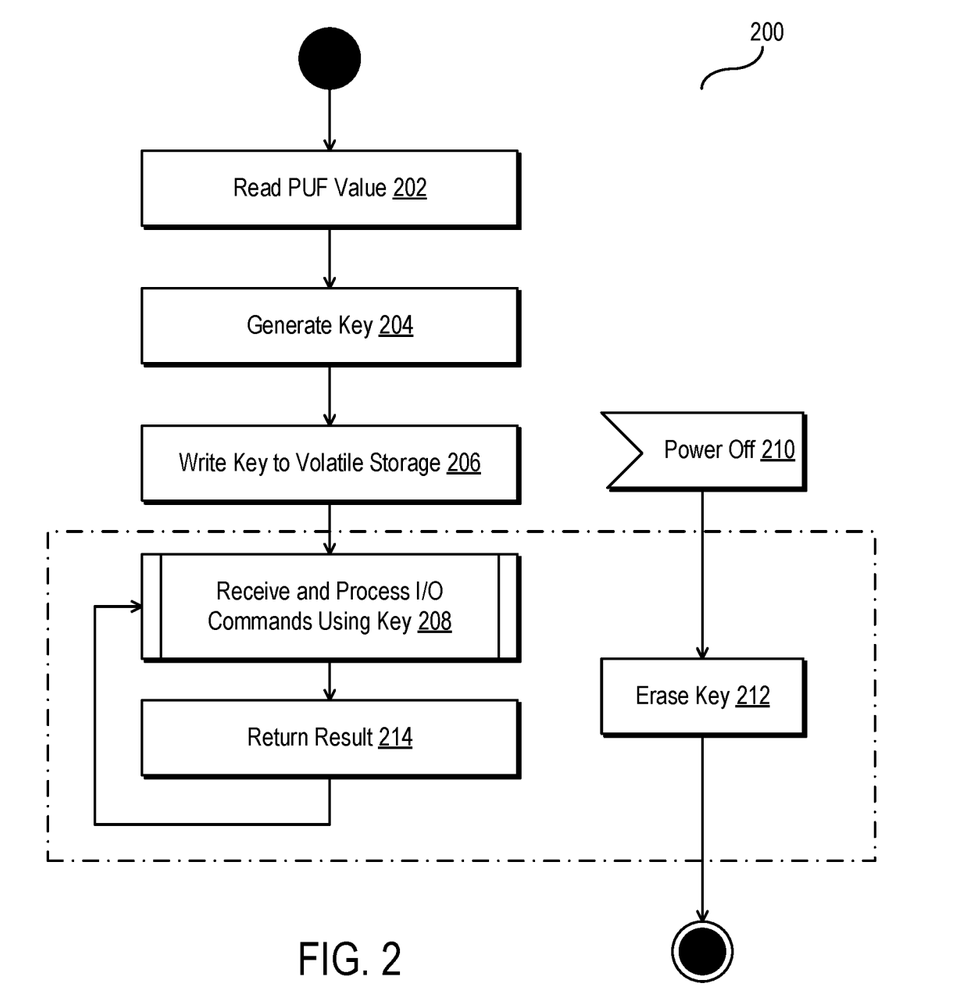
FIG. 2 is a flow diagram illustrating a method for securing processing commands in a memory device according to some embodiments.

FIG. 2 is a flow diagram illustrating a method for securing processing commands in a memory device according to some embodiments.

In block 202, method 200 can include reading a value of a PUF. In one embodiment, method 200 can read a fixed-length value from a PUF such as an SRAM PUF, Delay PUF, or any other PUF technology. In one embodiment, the value generated by the PUF comprises a static (i.e., constant) value that can be regenerated as needed when the PUF is powered on. The specific length of the PUF is not limited herein. In the illustrated embodiment, the value generated by the PUF can replace a random number used to generate an encryption/decryption key, as will be discussed. Specifically, the value generated by the PUF can be used to seed the key generation process.

In block 204, method 200 can include generating a cryptographic key. In some embodiments, method 200 generates the cryptographic key using the PUF value as a seed input and using a deterministic key generation algorithm.

In one embodiment, method 200 can comprise generating a symmetric cryptographic key. In another embodiment, method 200 can comprise generating an asymmetric key pair. In this embodiment, method 200 can comprise using the private key of such a key pair as the cryptographic key. Any well-known cryptographic key algorithm may be used to generate the cryptographic key, and no limit is placed on the type and size of key method 200 generates in block 204.

In one embodiment, method 200 can generate the cryptographic key by executing a cryptographic key generation algorithm stored in the firmware of a memory device. In another embodiment, method 200 can generate the cryptographic key by executing a cryptographic key generation algorithm implemented by an ASIC or FPGA. Method 200 can generate the cryptographic key by executing a cryptographic key generation algorithm implemented in a cryptographic co-processor.

In some embodiments, the output of the PUF is combined with a secret value to generate a salted PUF value for use by the cryptographic algorithm. In some embodiments, the key generation algorithm is implemented entirely in hardware, and thus a hardware implementation can output a cryptographic key in response to a latch signal which enables/disables the processing. In such an embodiment, the cryptographic key can be generated on-demand without any storage at all. For example, the output of such a circuit can be latched to an encryption or decryption algorithm implemented in hardware, and thus, all encryption and decryption can be performed in hardware without any storage of a key.

In block 206, method 200 can include writing the cryptographic key to a volatile storage area. In one embodiment, the volatile storage area can comprise a DRAM, SRAM, or register file. Other types of volatile storage may be used, and no limit is placed on the type of volatile storage. In general, any storage device that does not retain data when powered off can be used. In some embodiments, method 200 can write the key to a preconfigured (i.e., constant) location that is hardwired in the firmware or physically wired to a controller of a memory device.

In block 208, method 200 can include receiving and processing I/O commands using the cryptographic key.

In some embodiments, method 200 can receive commands to access a non-volatile storage area from a host processor or other external device via an interface. Such commands include, without limitation, commands to read and write data to the non-volatile storage area. Other commands should be considered to fall within the scope of the disclosure, such as those commands defined in the Open NAND Flash Interface (ONFI) specification.

Figure 3:
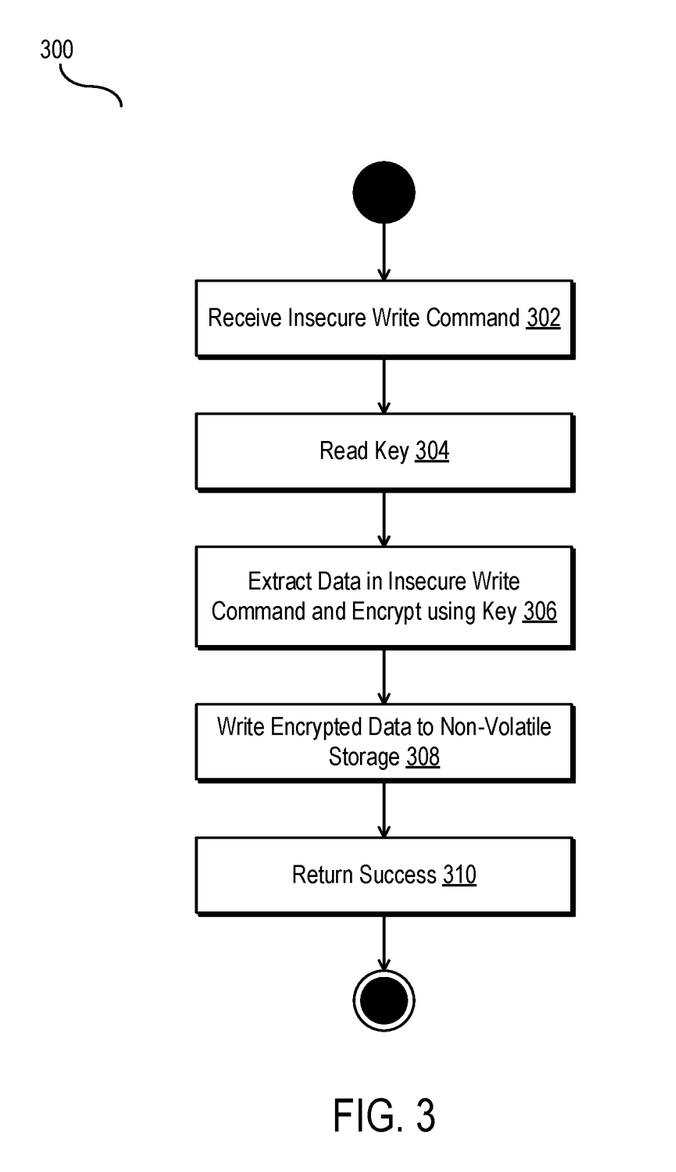
FIG. 3 is a flow diagram illustrating a method for securely writing data to a memory device according to some embodiments.
Figure 4:
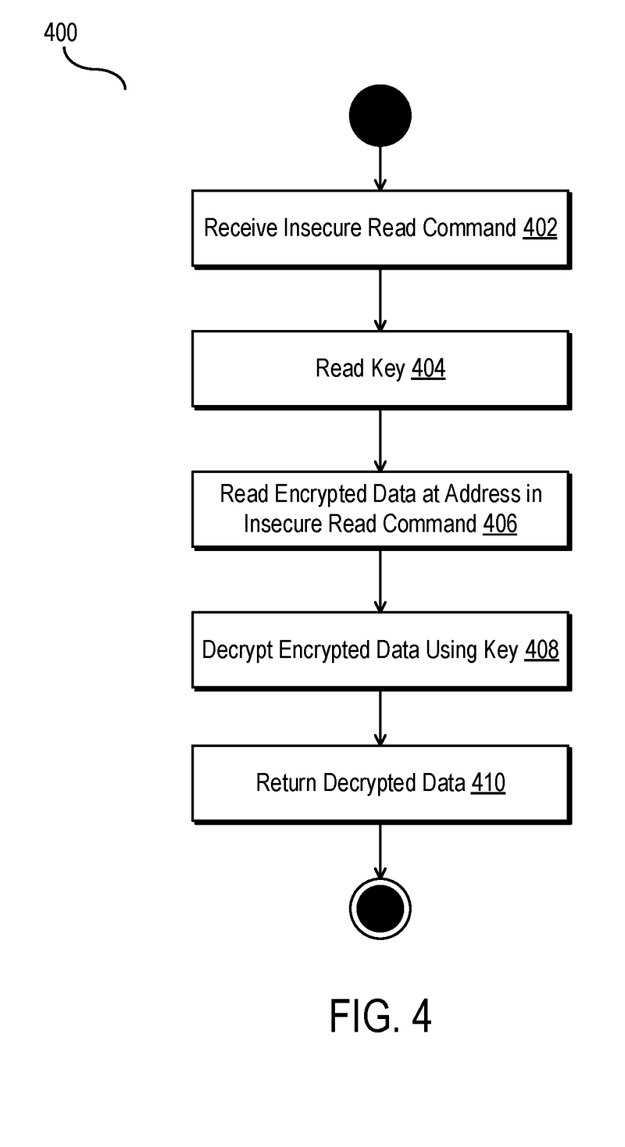
FIG. 4 is a flow diagram illustrating a method for securely reading data from a memory device according to some embodiments.

In general, a command received in block 208 is referred to as an "insecure" command. That is, the command is not subject to further processing prior to being issued to the non-volatile storage area. Thus, in the example of a write command, the data included in the insecure command is written (without substantive change) to the non-volatile storage area. Thus, if the memory device, including the non-volatile storage area, is powered off, the contents of the non-volatile storage area can be probed and read by a malicious user. While any command accessing a non-volatile storage area falls within the scope of block 208, FIGS. 3 and 4 provide further detail on write and read commands, respectively.

In block 214, method 200 can include returning a result in response to the command received in block 208. In alternative embodiments, the result return can depend on the type of insecure command received.

For example, if the insecure command comprises a read command, method 200 reads encrypted data from the non-volatile storage area (e.g., a page from a NAND Flash storage array), decrypts the data (as described in FIG. 4), writes the decrypted data to a page register, and ultimately returns the decrypted data to the host processor via the interface.

As another example, if the insecure command comprises a write or program command (e.g., an ONFI page program command), method 200 encrypts the data to be written to the non-volatile storage area (as described in FIG. 3) and then persists the encrypted data. Based on whether the write is successful, method 200 can comprise updating a status register or similar location to indicate a failure or lack of failure (i.e., success).

As illustrated, blocks 208 and 214 may be interrupted via a power-off interrupt event 210. Although only blocks 208 and 214 are illustrated as being interrupted, in some embodiments, other blocks may also be interrupted. In one embodiment, interrupt event 210 can comprise a physical event such as a physical powering off or loss of power to the memory device. Alternatively, or in conjunction with the foregoing, interrupt event 210 can comprise a software interrupt signaling a power-off condition. For example, the interrupt event 210 can comprise the triggering of a reset signal during a power-on reset. In all events, the memory device executing method 200 will lose power shortly after the interrupt occurs and, in some scenarios, immediately upon receiving the interrupt event 210.

In block 212, after a power-off interrupt event 210 is received, method 200 can comprise erasing the cryptographic key from the volatile storage area. In one embodiment, block 212 is performed implicitly or automatically. For example, if the interrupt event 210 comprises a physical powering off or power interruption, all contents stored in volatile memory will be erased due to the nature of the underlying data storage mechanism, which requires power to maintain its contents. Thus, in some embodiments, block 212 can operate as a function of the physical characteristics of the underlying volatile storage area, and the selection of technology to implement the volatile storage area can be chosen accordingly. In other embodiments, block 212 can comprise an affirmative step to erase the contents of the volatile storage area. For example, if interrupt event 210 comprises a software interrupt, code in firmware can affirmatively erase the contents of the volatile storage area (or only the location the key is written to) in addition to relying on an implicit erasing of the volatile storage area when power is lost.

In the foregoing embodiments, the key is generated using a PUF instead of a random number and thus can be arbitrarily erased and regenerated. Since the key can be regenerated as needed, it need not be stored in persistent storage. Since volatile storage is generally inaccessible when a device is powered off (e.g., during laboratory attacks), the key can be safely stored. Further, since all commands that access the non-volatile storage area are secured with the key, the data stored in the non-volatile storage area is indecipherable without the key.

FIG. 3 is a flow diagram illustrating a method for securely writing data to a memory device according to some embodiments.

In block 302, method 300 can include receiving in insecure write command. In one embodiment, the insecure write command includes an address to write data to and data to write. In one embodiment, the data to write comprises unencrypted data. No limit is placed on the type, size, or another characteristic of the data, however. Indeed, in some embodiments, a host processor issuing the insecure write command may encrypt the data to write itself using its own encryption algorithm. However, for purposes of method 300, any data received in a command from an external device is deemed insecure.

In block 304, method 300 can include reading the cryptographic key from the volatile storage area.

In one embodiment, the cryptographic key is stored in a preconfigured location (e.g., a designated register or designated address of DRAM or SRAM). In this embodiment, method 300 can read the cryptographic key from this location. In another embodiment, the volatile storage location of the cryptographic key can be hardwired (e.g., latched) to the controller of a memory device and thus read directly from this hardwired location.

In another embodiment, method 300 may not read the cryptographic key from the volatile storage location and may instead regenerate the key. In this embodiment, method 300 can perform block 204 in lieu of block 304. Since the cryptographic key is generated using a PUF instead of a random number, the corresponding key can be regenerated at will using the PUF value. In this embodiment, the cryptographic key is thus only stored in registers when needed and never persisted across commands. In some embodiments, if the cryptographic key generation algorithm is implemented in hardware, method 300 can latch the output of the PUF to the hardware-implemented algorithm and thus generate a key without any type of storage (since the output of the hardware-implemented algorithm can be input directly into an encryption algorithm also implemented in hardware).

In block 306, method 300 can include extracting data from the insecure write command and encrypting the data using the cryptographic key. In one embodiment, method 300 extracts the data from the body of the write command. In some embodiments, method 300 can extract the data by reading the data from a page register or similar structure designed to hold data to be written to a non-volatile storage area. After reading the data to be written (e.g., into a separate volatile storage area), method 300 can use the cryptographic key to encrypt the data. As discussed, any well-known encryption algorithm can be used to generate encrypted data.

In some embodiments, as discussed, the data to read is written to a designated register location prior to writing. In one embodiment, this register location can be physically latched to one input of an encryption circuit. A second input of the encryption circuit can be latched to the output of a key generation circuit, and the key generation circuit can be latched to a PUF. In such an embodiment, method 300 can use the output of the latched register location to read encrypted data without accessing the key directly.

In block 308, method 300 can include writing the encrypted data to the non-volatile storage area. In one embodiment, method 300 uses the original address in the insecure command and writes the encrypted data to that address. In some embodiments, this process can be performed using any existing techniques for writing to a non-volatile storage area. However, as illustrated, the data written is not the data received in the insecure command but rather the encrypted data generated using the cryptographic key. Notably, this data is encrypted using a key only present in the memory device when powered on and thus is inaccessible to any external devices.

In block 310, method 300 can include returning a success message in response to the insecure command. In one embodiment, method 300 can update a status register indicating the write of the encrypted data was successful. Thus, the status register can be read by the host processor to confirm the write. In some embodiments, the status register can be non-binary and include values that indicate that the encryption was unsuccessful (as well as indicating that the write itself was not successful).

FIG. 4 is a flow diagram illustrating a method for securely reading data from a memory device according to some embodiments.

In block 402, method 400 can include receiving an insecure read command. In one embodiment, the insecure read command includes an address to read data.

In block 404, method 400 can include reading the cryptographic key from the volatile storage area.

In one embodiment, the cryptographic key is stored in a preconfigured location (e.g., a designated register or designated address of DRAM or SRAM). In this embodiment, method 400 can read the cryptographic key from this location. In another embodiment, the volatile storage location of the cryptographic key can be hardwired (e.g., latched) to the controller of a memory device and thus read directly from this hardwired location.

In another embodiment, method 400 may not read the cryptographic key from the volatile storage location and may instead regenerate the key. In this embodiment, method 400 can perform block 204 in lieu of block 404. Since the cryptographic key is generated using a PUF instead of a random number, the corresponding key can be regenerated at will using the PUF value. In this embodiment, the cryptographic key is thus only stored in registers when needed and never persisted across commands. In some embodiments, if the cryptographic key generation algorithm is implemented in hardware, method 400 can latch the output of the PUF to the hardware-implemented algorithm and thus generate a key without any type of storage (since the output of the hardware-implemented algorithm can be input directly into an encryption algorithm also implemented in hardware).

In block 406, method 400 can include reading encrypted data from the non-volatile storage area at an address in the insecure read command. In one embodiment, method 400 can access the address in the read command load the data from the non-volatile storage area to a register location for caching read data. In some embodiments, this process can be performed using standard techniques for reading from a non-volatile storage area (e.g., NAND Flash storage array).

In block 408, method 400 can include decrypting the encrypted data using the cryptographic key.

After reading the data from the non-volatile storage area, method 400 can use the cryptographic key to decrypt the data. As discussed, any well-known decryption algorithm can be used to generate encrypted data. In the illustrated embodiment, the decryption algorithm comprises a decryption algorithm corresponding to the encryption algorithm used in block 306.

In some embodiments, as discussed, the data to read is written to a designated register location prior to returning the data to the host processor. In one embodiment, this register location can be physically latched to one input of a decryption circuit. A second input of the decryption circuit can be latched to the output of a key generation circuit, and the key generation circuit can be latched to a PUF. In such an embodiment, method 400 can use the output of the latched register location to decrypt the data without accessing the key directly.

In block 410, method 400 can include returning the decrypted data. In one embodiment, method 400 can comprise writing the decrypted data to a register for returning to the host processor. In one embodiment, this can comprise overwriting the encrypted data stored in the register location with the decrypted data.

Figure 5:
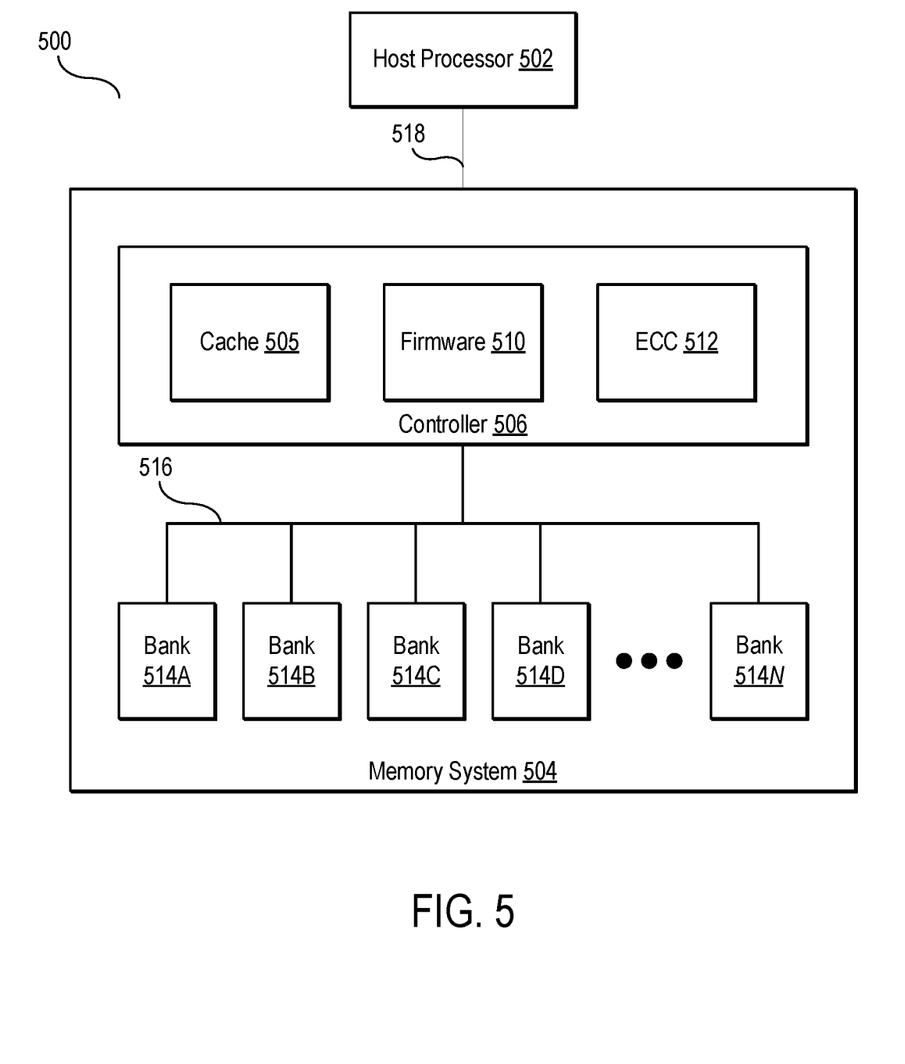
FIG. 5 is a block diagram illustrating a memory system according to some embodiments.

FIG. 5 is a block diagram illustrating a memory system according to some embodiments. Various features of FIG. 5 have been described logically in the description of FIG. 1, and those features are incorporated herein by reference in their entirety.

As illustrated in FIG. 5, a computing system 500 includes a host processor 502 communicatively coupled to a memory system 504 via a bus 518. The memory system 504 comprises a controller 506 communicatively coupled to one or more memory banks 514A-514N, forming a memory array via a bus/interface 516. As illustrated, controller 506 includes a local cache 505, firmware 510, and an error correction code (ECC) module 512.

In the illustrated embodiment, a host processor 502 can comprise any type of computer processor, e.g., a central processing unit (CPU), graphics processing unit (GPU), or other types of general-purpose or special-purpose computing devices. The host processor 502 includes one or more output ports that allow for the transmission of address, user, and control data between the host processor 502 and the memory system 504. In the illustrated embodiment, this communication is performed over bus 518. In one embodiment, bus 518 comprises an input/output (I/O) bus or a similar type of bus.

The memory system 504 is responsible for managing one or more memory banks 514A-514N. In one embodiment, the banks 514A-514N comprise NAND Flash dies or other configurations of non-volatile memory. In one embodiment, the memory banks 514A-514N comprise a memory array.

The banks 514A-514N are managed by controller 506. In some embodiments, controller 506 comprises a computing device configured to mediate access to and from banks 514A-514N. In one embodiment, controller 506 comprises an ASIC or other circuitry installed on a printed circuit board housing the banks 514A-514N. In some embodiments, controller 506 may be physically separate from the banks 514A-514N. The controller 506 communicates with the banks 514A-514N over the interface 516. In some embodiments, this interface 516 comprises a physically wired (e.g., traced) interface. In other embodiments, interface 516 comprises a standard bus for communicating with banks 514A-514N.

Controller 506 comprises various modules 505-512. In one embodiment, the various modules 505-512 comprise various physically distinct modules or circuits. In other embodiments, the modules 505-512 may completely (or partially) be implemented in software or firmware.

As illustrated, firmware 510 comprises the core of the controller and manages all operations of controller 506. The firmware 510 may implement some or all of the methods described above.

Figure 6:
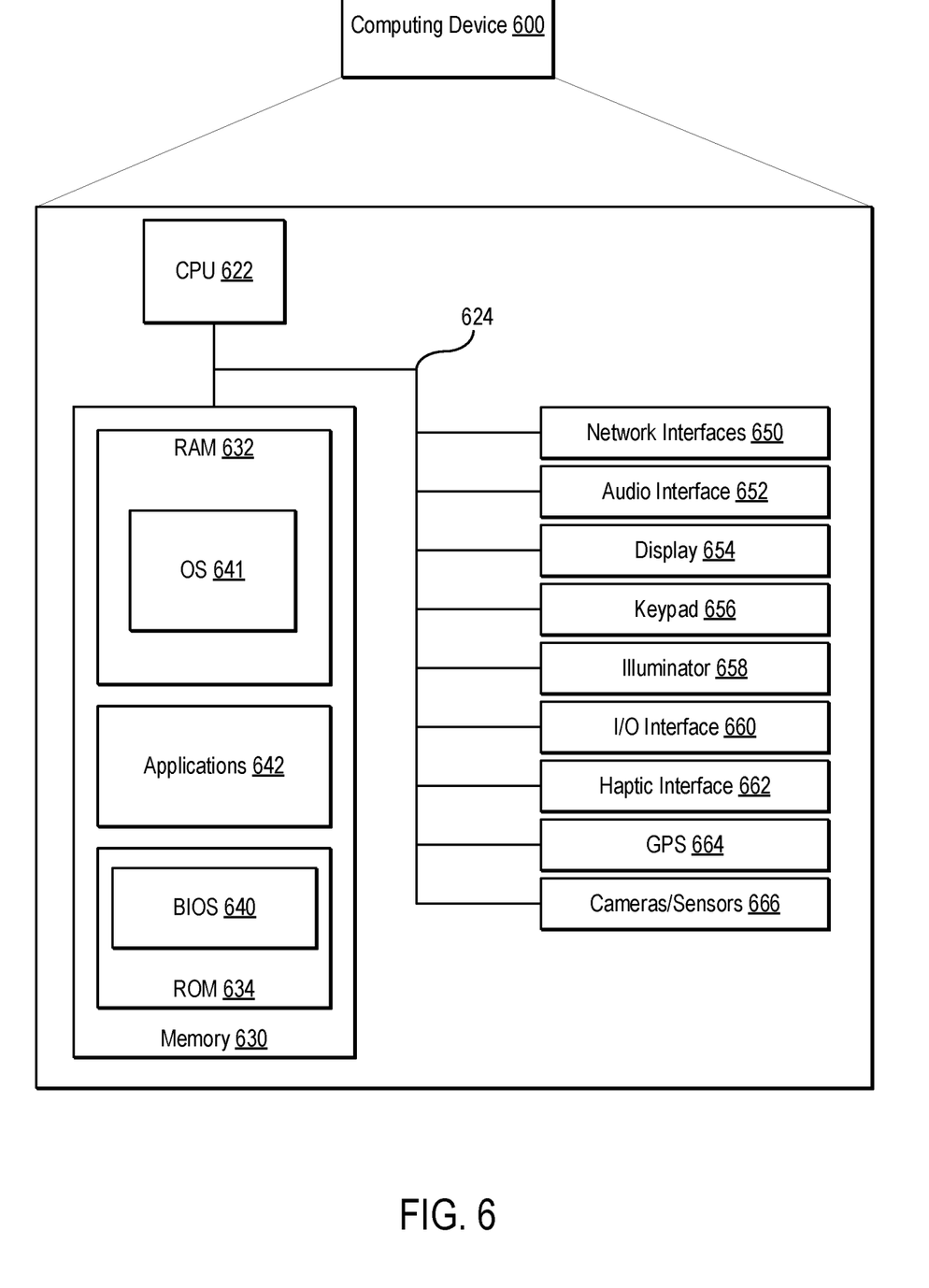
FIG. 6 is a block diagram illustrating a computing device showing an example of a client or server device used in the various embodiments of the disclosure.

FIG. 6 is a block diagram illustrating a computing device showing an example of a client or server device used in the various embodiments of the disclosure.

The device 600 can include more or fewer components than those shown in FIG. 6, depending on the deployment or usage of the device 600. For example, a server computing device, such as a rack-mounted server, may not include an audio interface 652, display 654, keypad 656, illuminator 658, haptic interface 662, Global Positioning System (GPS) receiver 664, or cameras/sensors 666. Some devices can include additional components not shown, such as graphics processing unit (GPU) devices, cryptographic co-processors, artificial intelligence (AI) accelerators, or other peripheral devices.

As shown in the figure, device 600 includes a central processing unit, CPU 622, in communication with a mass memory 630 via a bus 624. The device 600 also includes a network interface 650, an audio interface 652, a display 654, a keypad 656, an illuminator 658, an input/output interface 660, a haptic interface 662, a GPS receiver 664 and a camera(s) or other optical, thermal, or electromagnetic sensors such as cameras/sensors 666. Device 600 can include one camera/sensor or a plurality of cameras/sensors 666. The positioning of the cameras/sensors 666 on the device 600 can change per device 600 model, per device 600 capabilities, and the like, or some combination thereof.

In some embodiments, the CPU 622 can comprise a general-purpose CPU. The CPU 622 can comprise a single-core or multiple-core CPU. The CPU 622 can comprise a system-on-a-chip (SoC) or a similar embedded system. In some embodiments, a GPU can be used in place of, or in combination with, a CPU 622. Mass memory 630 can comprise a dynamic random-access memory (DRAM) device, a static random-access memory device (SRAM), or a Flash (e.g., NAND Flash) memory device. In some embodiments, mass memory 630 can comprise a combination of such memory types. In one embodiment, the bus 624 can comprise a Peripheral Component Interconnect Express (PCIe) bus. In some embodiments, the bus 624 can comprise multiple busses instead of a single bus.

Mass memory 630 illustrates another example of computer storage media for the storage of information such as computer-readable instructions, data structures, program modules, or other data. Mass memory 630 stores a basic input/output system, BIOS 640, for controlling the low-level operation of the device 600. In the illustrated embodiment, the BIOS 640 may be stored in a read-only memory (ROM) such as ROM 634. The mass memory also stores an operating system 641 for controlling the operation of the device 600.

Applications 642 can include computer-executable instructions which, when executed by the device 600, perform any of the methods (or portions of the methods) described previously in the description of the preceding Figures. In some embodiments, the software or programs implementing the method embodiments can be read from a hard disk drive (not illustrated) and temporarily stored in RAM 632 by CPU 622. CPU 622 can then read the software or data from RAM 632, process them, and store them in RAM 632 again.

The device 600 can optionally communicate with a base station (not shown) or directly with another computing device. Network interface 650 is sometimes known as a transceiver, transceiving device, or network interface card (NIC).

The audio interface 652 produces and receives audio signals such as the sound of a human voice. For example, the audio interface 652 can be coupled to a speaker and microphone (not shown) to enable telecommunication with others or generate an audio acknowledgment for some action. Display 654 can be a liquid crystal display (LCD), gas plasma, light-emitting diode (LED), or any other type of display used with a computing device. Display 654 can also include a touch-sensitive screen arranged to receive input from an object such as a stylus or a digit from a human hand.

Keypad 656 can comprise any input device arranged to receive input from a user. Illuminator 658 can provide a status indication or provide light.

The device 600 also comprises an input/output interface 660 for communicating with external devices, using communication technologies, such as USB, infrared, Bluetooth®, or the like. The haptic interface 662 provides tactile feedback to a user of the client device.

The GPS receiver 664 can determine the physical coordinates of the device 600 on the surface of the Earth, which typically outputs a location as latitude and longitude values. GPS receiver 664 can also employ other geo-positioning mechanisms, including, but not limited to, triangulation, assisted GPS (AGPS), E-OTD, CI, SAI, ETA, BSS, or the like, to further determine the physical location of the device 600 on the surface of the Earth. In one embodiment, however, the device 600 can communicate through other components, provide other information that can be employed to determine the physical location of the device, including, for example, a MAC address, IP address, or the like.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to the desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any programming language. It will be appreciated that a variety of programming languages can be used to implement the teachings of the disclosure as described herein.

The present disclosure can be provided as a computer program product or software that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as read-only memory ("ROM"), random access memory ("RAM"), magnetic disk storage media, optical storage media, flash memory components, etc.

In this description, various functions and operations are described as being performed by or caused by computer instructions to simplify the description. However, those skilled in the art will recognize what is meant by such expressions is that the functions result from the execution of the computer instructions by one or more controllers or processors, such as a microprocessor. Alternatively, or in combination, the functions and operations can be implemented using special-purpose circuitry, with or without software instructions, such as using Application-Specific Integrated Circuit (ASIC) or Field-Programmable Gate Array (FPGA). Embodiments can be implemented using hardwired circuitry without software instructions or in combination with software instructions. Thus, the techniques are limited neither to any specific combination of hardware circuitry and software nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    receiving, by a firmware installed in a memory device, a command accessing a non-volatile storage area from a host processor, wherein the non-volatile storage area comprises a NAND Flash array;
    generating, in response to receiving the command, a value from a physically unclonable function (PUF), the value comprising an output of a PUF;
    generating, using a key generation circuit installed in the memory device, a cryptographic key using the value, wherein the PUF is hardwired to an input of the key generation circuit and wherein the key generation circuit comprises a hardware encryption engine integrated within a controller of the memory device;
    storing the cryptographic key in a volatile storage area, the volatile storage area comprising one of a DRAM or SRAM storage area, the volatile storage accessible via the firmware; and
    processing, by the firmware, the command using the cryptographic key, wherein processing the command comprises encrypting or decrypting data stored in the command prior to accessing the non-volatile storage area using the hardware encryption engine wherein the hardware encryption engine receives the cryptographic key directly from the key generation circuit via a hardware latch.

2. The method of claim 1, wherein generating a cryptographic key comprises generating a symmetric cryptographic key.

3. The method of claim 1, wherein receiving a command accessing a non-volatile storage area comprises receiving a write command.

4. The method of claim 3, wherein processing the command using the cryptographic key comprises:
    extracting data from the command;
    encrypting the data using the cryptographic key to generate encrypted data; and
    writing the encrypted data to the non-volatile storage area.

5. The method of claim 1, wherein receiving a command accessing a non-volatile storage area comprises receiving a read command.

6. The method of claim 5, wherein processing the command using the cryptographic key comprises:
    reading encrypted data from the non-volatile storage area;

decrypting the encrypted data using the cryptographic key to generate decrypted data; and returning the decrypted data to the host processor.

7. A memory device comprising:

a non-volatile storage area;

a physically unclonable function (PUF), the PUF generating a unique value as an output of the PUF;

a key generation circuit comprising a hardware encryption engine integrated within a controller of the memory device configured to generate a cryptographic key using the unique value, wherein the output of the PUF is hardwired to an input of the key generation circuit; and firmware, the firmware including instructions for:
receiving a command accessing the non-volatile storage area from a host processor;
generating, in response to receiving the command, a value from a physically unclonable function (PUF), the value comprising an output of a PUF;
generating a cryptographic key using the key generation circuit;
storing the cryptographic key in a volatile storage area; and
processing the command using the cryptographic key, wherein processing the command comprises encrypting or decrypting data stored in the command prior to accessing the non-volatile storage area, wherein the hardware encryption engine receives the cryptographic key directly from the key generation circuit via a hardware latch.

8. The memory device of claim 7, wherein generating a cryptographic key comprises generating a symmetric cryptographic key.

9. The memory device of claim 7, wherein receiving a command accessing a non-volatile storage area comprises receiving a write command.

10. The memory device of claim 9, wherein processing the command using the cryptographic key comprises:
extracting data from the command;
encrypting the data using the cryptographic key to generate encrypted data; and
writing the encrypted data to the non-volatile storage area.

11. The memory device of claim 7, wherein receiving a command accessing a non-volatile storage area comprises receiving a read command.

12. The memory device of claim 11, wherein processing the command using the cryptographic key comprises:
reading encrypted data from the non-volatile storage area;
decrypting the encrypted data using the cryptographic key to generate decrypted data; and
returning the decrypted data to the host processor.

13. A non-transitory computer-readable storage medium for tangibly storing computer program instructions capable of being executed by a computer processor, the computer program instructions defining steps of:
receiving, by a firmware installed in a memory device, a command accessing a non-volatile storage area from a host processor;
generating, in response to receiving the command, a value from a physically unclonable function (PUF), the value comprising an output of a PUF;
generating, using a key generation circuit installed in the memory device, a cryptographic key using the value, wherein the output of the PUF is hardwired to an input of the key generation circuit and wherein the key generation circuit comprises a hardware encryption engine integrated within a controller of the memory device;
storing the cryptographic key in a volatile storage area; and
processing, by the firmware, the command using the cryptographic key, wherein processing the command comprises encrypting or decrypting data stored in the command prior to accessing the non-volatile storage area, wherein the hardware encryption engine receives the cryptographic key directly from the key generation circuit via a hardware latch.

14. The non-transitory computer-readable storage medium of claim 13, wherein generating a cryptographic key comprises generating a symmetric cryptographic key.

15. The non-transitory computer-readable storage medium of claim 13, wherein receiving a command accessing a non-volatile storage area comprises receiving a write command.

16. The non-transitory computer-readable storage medium of claim 15, wherein processing the command using the cryptographic key comprises:
extracting data from the command;
encrypting the data using the cryptographic key to generate encrypted data; and
writing the encrypted data to the non-volatile storage area.

17. The non-transitory computer-readable storage medium of claim 13, wherein receiving a command accessing a non-volatile storage area comprises receiving a read command.

18. The non-transitory computer-readable storage medium of claim 17, wherein processing the command using the cryptographic key comprises:
reading encrypted data from the non-volatile storage area;
decrypting the encrypted data using the cryptographic key to generate decrypted data; and
returning the decrypted data to the host processor.

19. The memory device of claim 7, wherein the PUF is latched to the key generation circuit.

20. The non-transitory computer-readable storage medium of claim 13, wherein the PUF is latched to the key generation circuit.

* * * * *